US008863612B2

(12) United States Patent
Owyang

(10) Patent No.: US 8,863,612 B2
(45) Date of Patent: Oct. 21, 2014

(54) LEVER POSITIONER ASSEMBLY

(76) Inventor: Mon Spencer Owyang, Watsonville, CA (US)

( * ) Notice: Subject to any disclaimer, the term of this patent is extended or adjusted under 35 U.S.C. 154(b) by 75 days.

(21) Appl. No.: 13/587,729

(22) Filed: Aug. 16, 2012

(65) Prior Publication Data

US 2013/0047777 A1 Feb. 28, 2013

Related U.S. Application Data

(60) Provisional application No. 61/526,144, filed on Aug. 22, 2011.

(51) Int. Cl.
G05G 1/04 (2006.01)
F16C 1/10 (2006.01)
B62K 23/06 (2006.01)

(52) U.S. Cl.
CPC .................................. B62K 23/06 (2013.01)
USPC ........................................... 74/525; 74/502.2

(58) Field of Classification Search
CPC ............................................. B62K 23/06
USPC ........ 74/473.14, 488, 489, 501.6, 502.2, 523, 74/525; 188/24.11, 344; 60/594
IPC ..... B62L 3/02; B60T 7/10, 11/18; B62K 23/02, B62K 23/06
See application file for complete search history.

(56) References Cited

U.S. PATENT DOCUMENTS

| 5,660,082 | A | * | 8/1997 | Hsieh | .......................... 74/502.2 |
| 5,839,544 | A | | 11/1998 | Yamashita | |
| 5,865,064 | A | | 2/1999 | Yamashita et al. | |
| 5,979,266 | A | | 11/1999 | Nagano | |
| 6,112,614 | A | | 9/2000 | Yamashita | |
| 6,161,448 | A | | 12/2000 | Wang | |
| 6,516,682 | B2 | * | 2/2003 | Brainard | ...................... 74/502.2 |
| 6,578,445 | B2 | | 6/2003 | Barnett | |
| 6,804,961 | B2 | | 10/2004 | Lumpkin | |
| 6,957,534 | B2 | | 10/2005 | Lumpkin | |
| RE39,757 | E | | 8/2007 | Yamashita | |
| 7,516,616 | B2 | * | 4/2009 | Tetsuka et al. | .................. 60/533 |
| 7,654,171 | B2 | * | 2/2010 | Wen | ............................ 74/502.2 |
| 7,793,565 | B2 | | 9/2010 | Orrico et al. | |
| 7,806,022 | B2 | | 10/2010 | Hara | |
| 8,061,234 | B2 | * | 11/2011 | Lavezzi et al. | .................. 74/522 |
| 8,281,903 | B2 | * | 10/2012 | Brioschi | .................... 188/24.11 |
| 8,336,308 | B2 | * | 12/2012 | Gherardi et al. | ............... 60/594 |
| 2004/0031347 | A1 | | 2/2004 | Barnett | |
| 2005/0097979 | A1 | | 5/2005 | Nago | |
| 2008/0229863 | A1 | | 9/2008 | Orrico et al. | |
| 2009/0301252 | A1 | | 12/2009 | Hsu | |
| 2012/0198957 | A1 | * | 8/2012 | Feldt et al. | .................... 74/502.2 |
| 2012/0222416 | A1 | * | 9/2012 | Hirose et al. | .................... 60/594 |

* cited by examiner

*Primary Examiner* — Thomas R. Hannon
*Assistant Examiner* — Adam D Rogers
(74) *Attorney, Agent, or Firm* — Roeder & Broder LLP; James P. Broder

(57) ABSTRACT

A lever positioner assembly that is coupled to a handlebar of a vehicle comprises a lever, a lever holder, and a lever positioner. The lever moves relative to the handlebar between a released position and an engaged position. The lever holder holds the lever. Additionally, the lever holder is coupled to and movable relative to the handlebar. The lever positioner is coupled to the lever and is positioned on the opposite side of the lever from the handlebar. Additionally, the lever positioner can include an adjuster screw that is selectively rotated to adjust the released position of the lever relative to the lever holder and the handlebar. The lever and the lever holder can move as a unitary structure during movement of the lever between the released position and the engaged position.

20 Claims, 4 Drawing Sheets

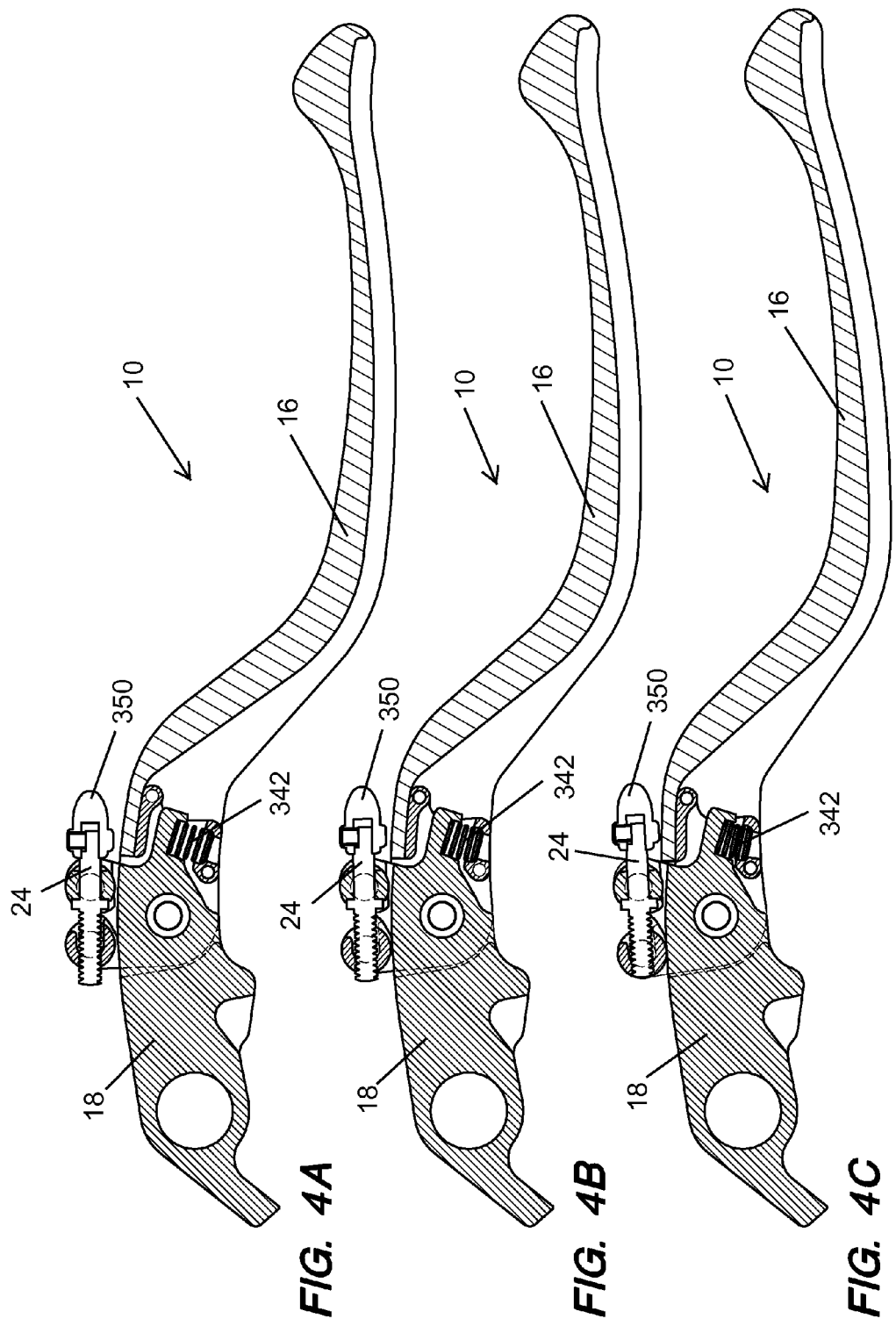

LEVER POSITIONER ASSEMBLY

RELATED INVENTION

This application claims priority on U.S. Provisional Application Ser. No. 61/526,144, filed Aug. 22, 2011 and entitled "LEVER POSITIONER ASSEMBLY". As far as permitted, the contents of U.S. Provisional Application Ser. No. 61/526,144 are incorporated herein by reference.

BACKGROUND

Recreational riding and competitive racing of two- and four-wheeled vehicles such as motorcycles and all-terrain vehicles has become increasingly popular in recent years. Riders and drivers (also sometimes generically referred to herein as "users") place great value on the ability to precisely control the functional operability of important mechanical components on their vehicles. Additionally, both recreational and avid users can be concerned about the comfort and adjustability of certain components of their vehicles. For instance, the adjustability of the static positioning of a motorcycle brake lever can be critical in the reduction of fatigue and/or increasing stamina in the hands, arms and shoulders of a rider. Further, the size of a rider's hands can dictate that the at-rest position of the brake lever is either closer or further away from the handlebar grip, without causing any significant change in the force required to move (e.g., activate) the lever. More specifically, a rider with smaller hands may be more comfortable with the lever closer to the grip resulting in a decreased lever throw, while a rider with larger hands may be better suited to having the lever further from the grip, resulting in a greater lever throw.

Unfortunately, many lever positioners are difficult to repair or replace due to their complexity. For example, certain lever positioners have small components that are relatively difficult to access because they are situated within an interior of the lever assembly. Further, some lever positioners lack modular components, requiring intricate repair or replacement at a substantially higher cost. Moreover, various conventional lever positioners lack versatility that is often desired in the recreational riding and/or racing community.

SUMMARY

The present invention is directed toward a lever positioner assembly that is coupled to a handlebar of a vehicle. In certain embodiments, the lever positioner assembly comprises a lever, a lever holder, and a lever positioner. The lever moves relative to the handlebar between a released position and an engaged position. The lever holder holds the lever. Additionally, the lever holder is coupled to and movable relative to the handlebar. The lever positioner is coupled to the lever and adjusts the released position of the lever relative to the lever holder and the handlebar. In certain embodiments, the lever positioner is positioned on the opposite side of the lever from the handlebar. In some embodiments, the lever and the lever holder move as a unitary structure during movement of the lever between the released position and the engaged position.

Additionally, in certain embodiments, the lever positioner includes an adjuster screw that is selectively rotated to adjust the released position of the lever relative to the lever holder and the handlebar. In such embodiments, the lever positioner assembly can further comprise a coupler assembly that movingly couples the lever to the lever holder, the coupler assembly enabling the released position of the lever relative to the handlebar to be adjusted. Further, the lever positioner can further include a first yoke having a first yoke aperture and a pair of first yoke detents, wherein the adjuster screw extends through the first yoke aperture, and wherein one of the first yoke detents extends through a positioner aperture of the lever holder and the other first yoke detent extends through a detent aperture in the coupler assembly. Moreover, in one embodiment, the lever positioner can still further include a second yoke including a second yoke aperture and a pair of second yoke detents, wherein the adjuster screw is selectively threaded into the second yoke aperture, and wherein one of the second yoke detents extends into a first slot in the coupler assembly and the other second yoke detent extends into a second slot in the coupler assembly. In such embodiment, when the adjuster screw is rotated, the second yoke detents can move laterally within the first slot and the second slot.

In one embodiment, the lever positioner is positioned on the opposite side of the lever from the handlebar.

Additionally, in some embodiments, the lever positioner assembly further comprises a coupler assembly that movingly couples the lever to the lever holder, the coupler assembly enabling the released position of the lever relative to the handlebar to be adjusted.

The present invention is further directed toward a vehicle including a handlebar, the lever positioner assembly as describe above that is coupled to the handlebar, and an actuator that is secured to the lever holder, the actuator selectively actuating a device, and the lever positioner adjusting the released position of the lever without moving the actuator relative to the lever holder.

BRIEF DESCRIPTION OF THE DRAWINGS

The novel features of this invention, as well as the invention itself, both as to its structure and its operation, will be best understood from the accompanying drawings, taken in conjunction with the accompanying description. in which similar reference characters refer to similar parts, and in which:

FIG. 4A is a sectional view of the lever positioner assembly illustrated in FIG. 1, with the lever shown in a first position;

FIG. 4B is a sectional view of the lever positioner assembly illustrated in FIG. 1, with the lever shown in a second position; and FIG. 4C is a sectional view of the lever positioner assembly illustrated in FIG. 1, with the lever shown in a third position.

DESCRIPTION

Reference will now be made in detail to various embodiments of the subject matter, examples of which are illustrated in the accompanying drawings. While the subject matter discussed herein will be described in conjunction with various embodiments, it will be understood that they are not intended to limit the described subject matter to these embodiments. On the contrary, the presented embodiments of the invention are intended to cover alternatives, modifications and equivalents that may be included within the spirit and scope of the various embodiments as defined by the appended claims. For example, although the present invention is described in relation to use with a motorcycle, the present invention is equally applicable in other types of vehicles (e.g., all-terrain vehicles (ATVs), bicycles, etc., that utilize clutch and/or brake levers. Furthermore, in the following description of embodiments, numerous specific details are set forth in order to provide a thorough understanding of embodiments of the subject matter. However, embodiments may be practiced without these specific details. In other instances, well known methods, procedures, components, and circuits have not been described in detail so as to not unnecessarily obscure aspects of the described embodiments.

As an overview, the present invention is directed toward a lever positioner assembly 10 for a vehicle 12, e.g., a motorcycle, ATV, bicycle or any other vehicle that uses a hand lever to selectively activate an actuating mechanism (also referred to herein as an "actuator") for actuating a device 13 (illustrated for simplicity as a rectangle), such as a brake or clutch. A suitable actuating mechanism for the device can include a cable or hydraulics, as non-exclusive examples. Although the description provided herein is particularly suited to and focuses on a brake lever assembly that actuates a brake on a motorcycle, it is recognized that the present invention can be used in conjunction with a variety of other devices on any type of vehicle. For example, the present invention can be used to adjust the positioning of a clutch lever that actuates a clutch, either through the use of a cable 15 or by hydraulics or other suitable means.

Figure 1:
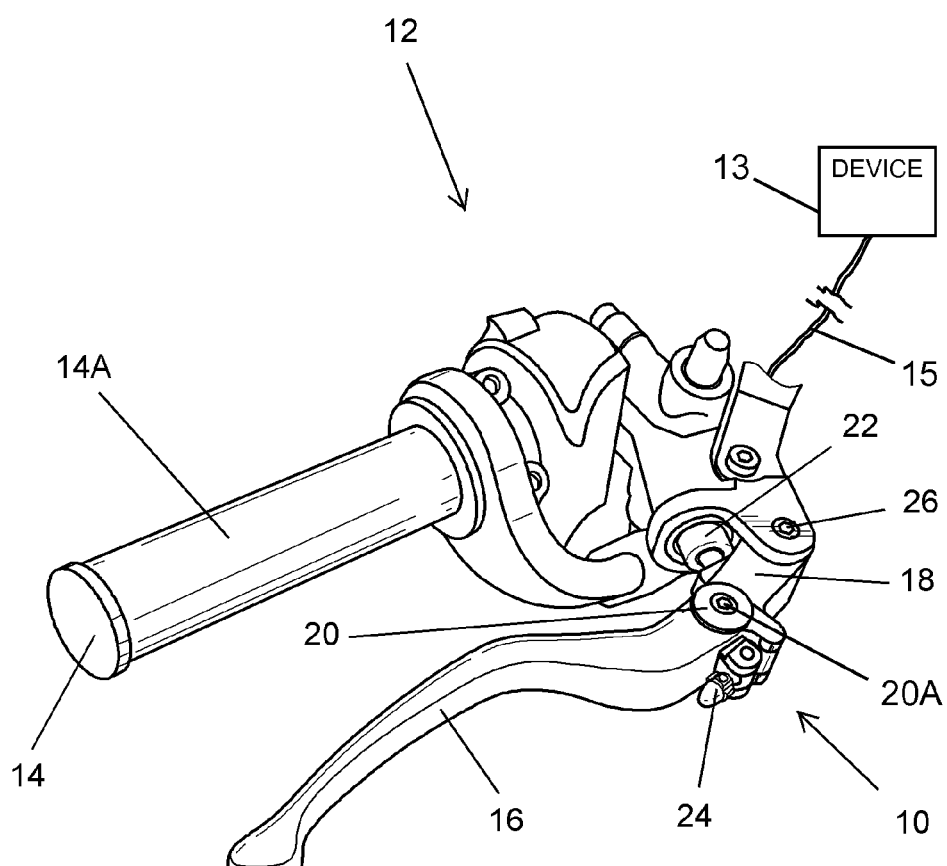
FIG. 1 is a perspective view of a portion of a vehicle including a handlebar grip and one embodiment of a lever positioner assembly having a lever, a lever holder and a lever positioner.

FIG. 1 is a perspective view of a portion of the vehicle 12 including a handlebar 14 having a handlebar grip 14A and one embodiment of the lever positioner assembly 10 having features of the present invention. The handlebar 14 and/or the handlebar grip 14A can be designed to be comfortably grasped by the user when the user is riding on the vehicle 12. In some embodiments, the handlebar grip 14A can be made from a formed rubber or other substance that can be easily and comfortably grasped by the user.

The lever positioner assembly 10 is coupled to the handlebar 14 of the vehicle 12. The design of the lever positioner assembly 10 can be varied to suit the specific requirements of the vehicle 12 and/or for the user of the vehicle 12. In the embodiment illustrated in FIG. 1, the lever positioner assembly 10 includes a lever 16, a lever holder 18, a coupler assembly 20, an actuator 22, and a lever positioner 24.

The lever 16 actuates a device 13 on the vehicle 12. For example, as provided above, the lever 16 can be used to actuate a brake, a clutch, or some other device on the vehicle 12. Additionally, the lever 16 is selectively movable by the user relative to the handlebar 14 between a released position and an engaged position, When in the released position, the user is not squeezing or otherwise moving the lever 16 relative to the handlebar 14, e.g., toward the handlebar 14, and the device 13 is not being actuated. Conversely, when in the engaged position, the user has squeezed or otherwise moved the lever 16 relative to the handlebar 14, e.g., toward the handlebar 14, in order to actuate the device 13. When the user no longer wants to actuate the device 13, the user releases the lever 16 and the lever 16 returns to the released position relative to the handlebar 14. More specifically, in this embodiment, the lever 16 is biased to be positioned in and/or returned to the released position relative to the handlebar 14.

The size and shape of the lever 16 can be varied. In certain embodiments, the lever 16 has a size and shape such that the lever 16 can be easily grasped by the user when holding onto the handlebar 14 in order to quickly and easily actuate the device 13 by moving the lever 16 relative to the handlebar 14 from the released position to the engaged position.

The lever holder 18 holds the lever 16 and/or couples the lever 16 to the rest of the vehicle 12. Additionally, in certain embodiments, the lever holder 18 is coupled to and is movable relative to the handlebar 14. More particularly, as shown in the embodiment illustrated in FIG. 1, the lever holder 18 can pivot relative to the handlebar 14 about a first pivot pin 26.

Further, in some embodiments, the lever holder 18 and the lever 16 can move together as a unitary structure during movement of the lever 16 between the released position and the engaged position. In particular, in such embodiments, as the user of the vehicle 12 moves the lever 16 relative to the handlebar 14 between the released position and the engaged position, the lever holder 18 also moves, e.g., pivots, relative to the handlebar 14. Alternatively, some relative motion between the lever holder 18 and the lever 16 may also be possible during the movement of the lever 16 between the released position and the engaged position.

Additionally, in this embodiment, the coupler assembly 20 movingly couples the lever 16 to the lever holder 18. More particularly, the coupler assembly 20 pivotably couples the lever 16 to the lever holder 18 about a second pivot pin 20A in order that the released position of the lever 16 relative to the handlebar 14 can be adjusted or varied as desired to suit the comfort of the user. In this embodiment, the second pivot pin 20A is spaced apart from the first pivot pin 26.

As shown in the embodiment illustrated in FIG. 1, the actuator 22 can be secured to the lever holder 18, As stated above, the actuator 22 is used to actuate the device 13, i.e. the brake, the clutch, or other device on the vehicle 12, through use of a cable 15, hydraulics, or other suitable means. More particularly, the actuator 22 actuates the device 13 when the lever 16 moves from the released position to the engaged position. Stated another way, as the lever 16 moves from the released position to the engaged position, the lever holder 18 also moves relative to the handlebar 14, which in turn serves to activate the actuator 22 that actuates the device 13. Additionally, when the lever 16 is moved from the engaged position back to the released position, the lever holder 18 no longer activates the actuator 22 and thus, the actuator 22 no longer actuates the device 13.

The lever positioner 24 is coupled and/or secured to the lever 16 and adjusts the released position of the lever 16 relative to the lever holder 18 and the handlebar 14. More specifically, in this embodiment, the lever positioner 24 pivots the released position of the lever 16 about the coupler assembly 20 relative to the lever holder 18 and the handlebar 14 so that the released position of the lever 16 more effectively suits the comfort of the user, and reduces the fatigue and/or increases the stamina in the hands, arms and shoulders of the user.

In one embodiment, the lever positioner 24 can adjust the released position of the lever 16 relative to the lever holder 18 and the handlebar 14 without moving the actuator 22 relative to the lever holder 18. Additionally, as shown in the embodiment illustrated in FIG. 1, the lever positioner 24 can be positioned on the opposite side of the lever 16 from the handlebar 14 and/or the handlebar grip 14A. In other words, the lever 16 can be positioned between (or directly between) the lever positioner 24 and the handlebar 14 and/or the handlebar grip 14A. Alternatively, the lever positioner 24 can be positioned on or relative to the lever 16 in another suitable position. The design of various embodiments of the lever positioner 24 will be described in greater detail herein below.

Figure 2:
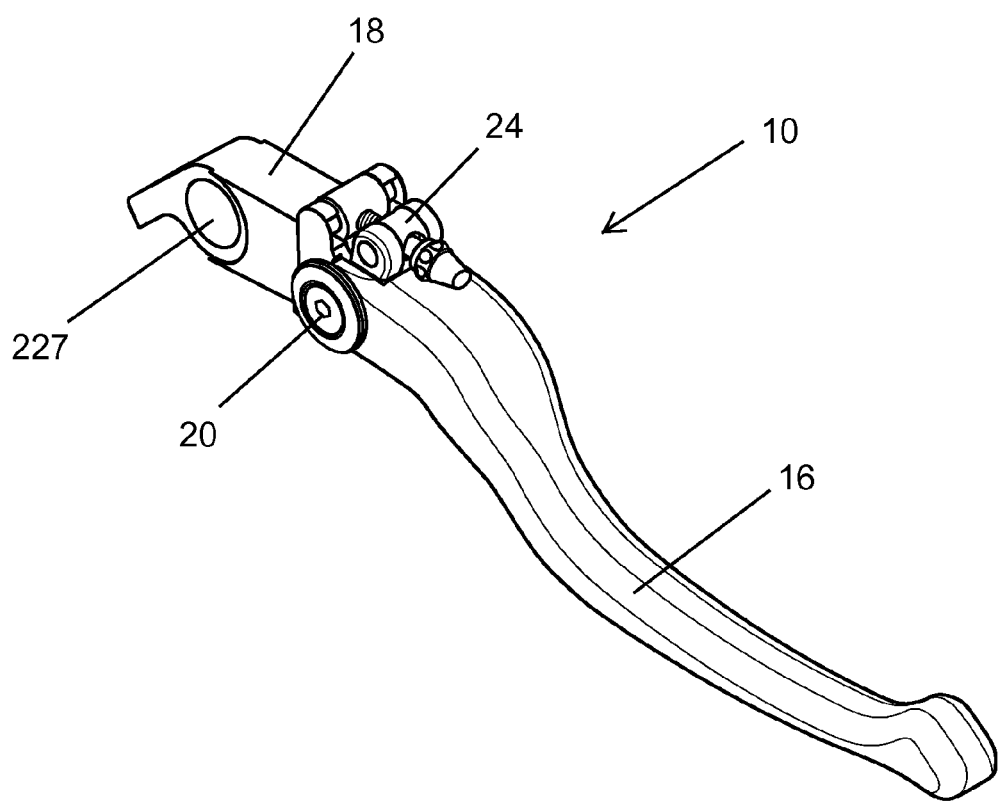
FIG. 2 is a perspective view the lever positioner assembly illustrated in FIG. 1.

FIG. 2 is a perspective view of the lever positioner assembly 10 illustrated in FIG. 1. In particular, FIG. 2 again illustrates the general design and positioning of the lever 16, the lever holder 18, the coupler assembly 20 and the lever positioner 24 relative to one another. Additionally, as shown in FIG. 2, the lever holder 18 can include a pivot aperture 227.

The pivot aperture 227 is adapted to receive the first pivot pin 26 (illustrated in FIG. 1) about which the lever holder 18 can pivot relative to the handlebar 14 (illustrated in FIG. 1).

Figure 3:
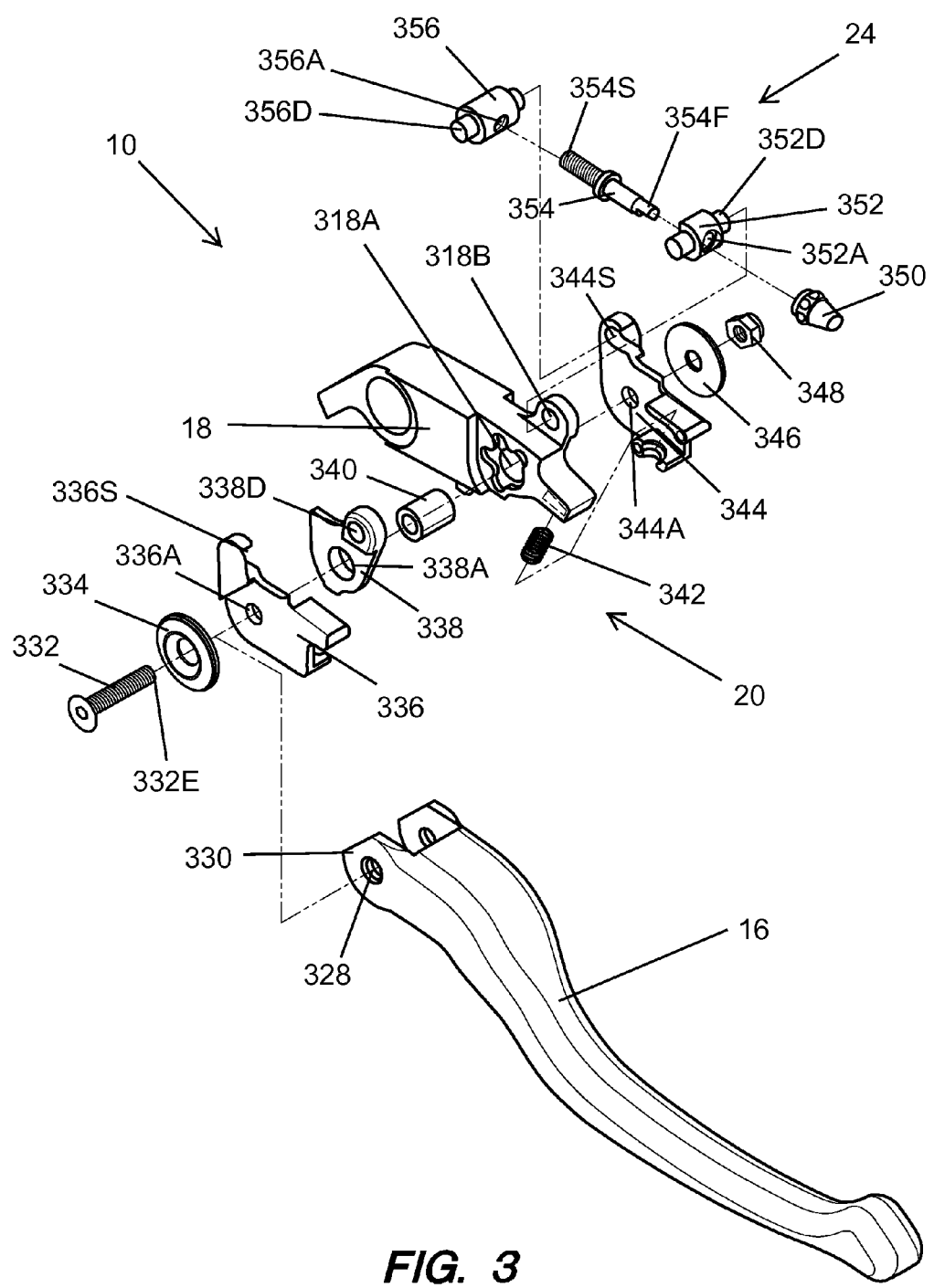
FIG. 3 is an exploded view of the lever positioner assembly illustrated in FIG. 1.

FIG. 3 is an exploded view of the lever positioner assembly 10 illustrated in FIG. 1. More particularly, FIG. 3 illustrates the specific elements of one embodiment of the coupler assembly 20 and the specific elements of one embodiment of the lever positioner 24.

As shown, the lever 16 can include a pair of lever apertures 328 positioned near a distal end 330 of the lever 16. Additionally, in this embodiment, at least a portion of the coupler assembly 20 extends through the lever apertures 328 to movingly and/or pivotably couple the lever 16 to the lever holder 18.

Further, as shown, the lever holder 18 can include a coupler aperture 318A and a positioner aperture 318B. In this embodiment, at least a portion of the coupler assembly 20 extends through the coupler aperture 318A to enable the lever 16 to be moved and/or pivoted relative to the lever holder 18 when the lever 16 is in the released position. Additionally, at least a portion of the lever positioner 24 extends through the positioner aperture 318B.

As provided above, the coupler assembly 20 movingly couples the lever 16 to the lever holder 18. The design of the coupler assembly 20 can be varied to suit the specific requirements of the lever positioner assembly 10. For example, the coupler assembly 20 can include more elements or fewer elements than those specifically illustrated in FIG. 3. As shown in the embodiment illustrated in FIG. 3, the coupler assembly 20 can include a screw 332, a pivot flange 334, a first flange plate 336, a retainer plate 338, a spacer 340, a spring 342 (e.g., a preload spring), a second flange plate 344, a washer 346, and a nut 348. The various elements of the coupler assembly 20, as listed herein, fit together and cooperate to couple the lever 16 to the lever holder 18 and enable the lever 16 to be pivotably secured to the lever holder 18 so that the released position of the lever 16 relative to the handlebar 14 (illustrated in FIG. 1) can be adjusted and/or varied as desired. More specifically, when the coupler assembly 20 is assembled, the screw 332 extends and/or is threaded through the pivot flange 334, the lever apertures 328 of the lever 16, a first plate aperture 336A in the first flange plate 336, a retainer plate aperture 338A in the retainer plate 338, the spacer 340, the coupler aperture 318A of the lever holder 318, a second plate aperture 344A in the second flange plate 344, and the washer 346, before the nut 348 is threaded onto a distal end 332E of the screw 332.

It should be noted that the use of the terms "first flange plate" and "second flange plate" is merely for ease of discussion, and either flange plate 336, 344 can be referred to as the "first flange plate" and/or the "second flange plate" without altering the intended breadth and scope of the present invention.

Additionally, as provided above, the lever positioner 24 adjusts the released position of the lever 16 relative to the lever holder 18 and the handlebar 14. The design of the lever positioner 24 can be varied can be varied to suit the specific requirements of the lever positioner assembly 10. For example, the lever positioner 24 can include more elements or fewer elements than those specifically illustrated in FIG. 3. As shown in the embodiment illustrated in FIG. 3, the lever positioner 24 can include a positioner cap 350, a first yoke 352, an adjuster screw 354, and a second yoke 356. Thus, in an embodiment where the lever positioner 24 is positioned on the opposite side of the lever 16 from the handlebar 14 and/or the handlebar grip 14A, as illustrated in FIG. 1 each of the positioner cap 350, the first 352, the adjuster screw 354, and the second yoke 356 are positioned at least substantially, if not entirely, on the opposite side of the lever 16 from the handlebar 14 and/or the handlebar grip 14A.

It should be noted that the use of the terms "first yoke" and "second yoke" is merely for ease of discussion, and either yoke 352, 356 can be referred to as the "first yoke" and/or the "second yoke" without altering the intended breadth and scope of the present invention.

The positioner cap 350 is positioned over and secured to a first end 354F, i.e. a non-threaded end, of the adjuster screw 354. Thus, during use, i.e. during adjustment of the lever positioner 24, rotation of the positioner cap 350 results in the corresponding rotation of the adjuster screw 354.

As illustrated, the first yoke 352 includes a first yoke aperture 352A and a pair of first yoke detents 352D. The first yoke aperture 352A is a non-threaded aperture, and the first end 354F of the adjuster screw 354 extends through the first yoke aperture 352A. Additionally, one of the first yoke detents 352D extends through the positioner aperture 318B of the lever holder 18 and the other first yoke detent 352D extends through a detent aperture 338D in the retainer plate 338.

As provided above, the adjuster screw 354 includes the non-threaded first end 354F that extends through the first yoke aperture 352A and that is fixedly secured within the positioner cap 350. Additionally, the adjuster screw 354 further includes a second end 354S, i.e. a threaded end, that is threaded into a second yoke aperture 356A of the second yoke 356. Accordingly, rotation of the positioner cap 350 results in the corresponding rotation of the adjuster screw 354, which results in the second end 354S of the adjuster screw 354 being threaded to a greater or lesser extent into or through the second yoke aperture 356A depending on the direction of rotation.

In the embodiment illustrated in FIG. 3, the second yoke 356 includes the second yoke aperture 356A and a pair of second yoke detents 356D. As noted above, the second yoke aperture 356A is a threaded aperture, and the second end 354S of the adjuster screw 354 is selectively threaded into and/or through the second yoke aperture 356A. Additionally, one of the second yoke detents 356D extends into a first slot 336S in the first flange plate 336 and the other second yoke detent 356D extends into a second slot 344S in the second flange plate 344.

During use, i.e. during adjustment of the lever positioner 24, as the second end 354S of the adjuster screw 354 is threaded into or out of the second yoke aperture 356A, the second yoke detents 356D move laterally within the first slot 336S in the first flange plate 336 and the second slot 344S in the second flange plate 344, respectively. This further results in the rotation of the flange plates 336, 344, and thus, the rotation or pivoting of the lever 16 relative to the lever holder 18. Accordingly, the released position of the lever relative to the lever holder 18 and the handlebar 14 can be selectively adjusted and varied to suit the comfort of the user.

FIGS. 4A-4C are sectional views of the lever positioner assembly 10 with the lever 16 shown in a first position, a second position, and a third position when the lever 16 is in the released position. It should be noted that although only three specific positions of the lever 16 are illustrated in FIGS. 4A-4C, the lever 16 can be positioned in an infinite number of positions along a continuum between an outermost position, wherein the lever 16 is positioned as far away from the handlebar 14 (illustrated in FIG. 1) in the released position as the specific design allows, and an innermost position, wherein the lever 16 is positioned as close to the handlebar 14 in the released position as the specific design allows.

More particularly, FIG. 4A is a sectional view of the lever positioner assembly 10 illustrated in FIG. 1, with the lever 16 shown in a first released position; FIG. 4B is a sectional view of the lever positioner assembly 10 illustrated in FIG. 1, with the lever 16 shown in a second released position; and FIG. 4C is a sectional view of the lever positioner assembly 10 illustrated in FIG. 1, with the lever 16 shown in a third released position.

As illustrated in FIG. 4A, when the lever 16 is in the first released position, the lever 16 extends somewhat downward at an angle relative to the lever holder 18 and the lever positioner 24. In the first released position, the lever 16 is spaced apart from the positioner cap 350 of the lever positioner 24. Additionally, as shown in FIG. 4A, the spring 342 is in an uncompressed position.

As illustrated in FIG. 4B, when the lever 16 is in the second released position, the lever 16 extends slightly downward at an angle (i.e. at a lesser angle than in the first released position) relative to the lever holder 18 and the lever positioner 24. In the second released position, the lever 16 is spaced apart from the positioner cap 350 of the lever positioner 24, although to a lesser degree than in the first released position. Additionally, as shown in FIG. 4B, the spring 342 is in a slightly compressed position.

As illustrated in FIG. 4C, when the lever 16 is in the third released position, the lever 16 extends substantially parallel to the lever holder 18 and the lever positioner 24. In the third released position, the lever 16 is substantially adjacent to the positioner cap 350 of the lever positioner 24. Additionally, as shown in FIG. 4C, the spring 342 is in a more greatly compressed position.

While a number of exemplary aspects and embodiments of a lever positioner assembly 10 have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A lever positioner assembly that is coupled to a handlebar of a vehicle, the lever positioner assembly comprising:
a lever that moves relative to the handlebar between a released position and an engaged position;
a lever holder that is coupled to the lever, the lever holder being coupled to and movable relative to the handlebar; and
a lever positioner that is coupled to the lever and that adjusts the released position of the lever relative to the lever holder and the handlebar, the lever positioner including an adjuster screw that is rotatable to adjust the released position of the lever relative to the lever holder and the handlebar, the entire adjuster screw being positioned on the opposite side of the lever from the handlebar;
wherein the lever and the lever holder move as a unitary structure during movement of the lever between the released position and the engaged position.

2. The lever positioner assembly of claim 1 further comprising a coupler assembly that movingly couples the lever to the lever holder, the coupler assembly enabling the released position of the lever relative to the handlebar to be adjusted.

3. The lever positioner assembly of claim 1 wherein the lever holder pivots relative to the handlebar.

4. The lever positioner assembly of claim 1 wherein the lever holder includes a first pivot pin and a second pivot pin that is spaced apart from the first pivot pin.

5. A vehicle including a handlebar, the lever positioner assembly of claim 1 that is coupled to the handlebar, and an actuator that is secured to the lever holder, the actuator selectively actuating a device, and the lever positioner adjusting the released position of the lever without moving the actuator relative to the lever holder.

6. The lever positioner assembly of claim 1 wherein the adjuster screw extends into neither of the lever and the lever holder.

7. A lever positioner assembly that is coupled to a handlebar of a vehicle, the vehicle including a device, the lever positioner assembly comprising:
a lever that moves relative to the handlebar between a released position and an engaged position;
a lever holder that holds the lever, the lever holder being coupled to and movable relative to the handlebar;
a lever positioner that is coupled to the lever and that adjusts the released position of the lever relative to the lever holder and the handlebar, the lever positioner is positioned on the opposite side of the lever from the handlebar; and
an actuator that is directly secured to the lever holder, the actuator actuating the device when the lever moves from the released position to the engaged position;
wherein the lever positioner adjusts the released position of the lever without moving the actuator relative to the lever holder.

8. The lever positioner assembly of claim 7 wherein the lever positioner includes an adjuster screw that is selectively rotated to adjust the released position of the lever relative to the lever holder and the handlebar.

9. The lever positioner assembly of claim 8 further comprising a coupler assembly that movingly couples the lever to the lever holder, the coupler assembly enabling the released position of the lever relative to the handlebar to be adjusted.

10. The lever positioner assembly of claim 8 wherein the entire adjuster screw is positioned on the opposite side of the lever from the handlebar.

11. The lever positioner assembly of claim 7 further comprising a coupler assembly that movingly couples the lever to the lever holder, the coupler assembly enabling the released position of the lever relative to the handlebar to be adjusted.

12. The lever positioner assembly of claim 7 wherein the lever holder pivots relative to the handlebar.

13. The lever positioner assembly of claim 7 wherein the lever holder includes a first pivot pin and a second pivot pin that is spaced apart from the first pivot pin.

14. A vehicle including a handlebar, a device, and the lever positioner assembly of claim 7 that is coupled to the handlebar, wherein the actuator actuates the device when the lever moves from the released position to the engaged position.

15. A lever positioner assembly that is coupled to a handlebar of a vehicle, the lever positioner assembly comprising:
a lever that moves relative to the handlebar between a released position and an engaged position;
a lever holder that is coupled to the lever, the lever holder being coupled to and movable relative to the handlebar; and
a lever positioner that is coupled to the lever and that adjusts the released position of the lever relative to the lever holder and the handlebar, the lever positioner including an adjuster screw that is rotatable to adjust the released position of the lever relative to the lever holder and the handlebar, wherein the adjuster screw does not extend into or between any portions of the lever, and wherein the adjuster screw does not extend into or between any portions of the lever holder.

16. The lever positioner assembly of claim 15 wherein the entire adjuster screw is positioned on the opposite side of the lever from the handlebar.

17. The lever positioner assembly of claim 15 further comprising a coupler assembly that movingly couples the lever to the lever holder, the coupler assembly enabling the released position of the lever relative to the handlebar to be adjusted.

18. The lever positioner assembly of claim 15 wherein the lever holder pivots relative to the handlebar.

19. The lever positioner assembly of claim 15 wherein the lever holder includes a first pivot pin and a second pivot pin that is spaced apart from the first pivot pin.

20. A vehicle including a handlebar, the lever positioner assembly of claim 15 that is coupled to the handlebar, and an actuator that is secured to the lever holder, the actuator selectively actuating a device, and the lever positioner adjusting the released position of the lever without moving the actuator relative to the lever holder.

* * * * *